United States Patent [19]

Fasulo et al.

[11] Patent Number: 5,250,618
[45] Date of Patent: Oct. 5, 1993

[54] BLENDS BASED ON VINYL AROMATIC POLYMERS WITH ENHANCED MECHANICAL CHARACTERISTICS

[75] Inventors: Gian C. Fasulo, San Silvestro; Dario Ghidoni, Gonzaga; Andrea Callaioli, Mantova; Savino Matarrese, Verona, all of Italy

[73] Assignee: Montedipe S.r.l., Italy

[21] Appl. No.: 654,462

[22] Filed: Feb. 13, 1991

[30] Foreign Application Priority Data

Feb. 16, 1990 [IT] Italy ................. 19382 A/90

[51] Int. Cl.$^5$ .............................. C08L 53/02
[52] U.S. Cl. ...................... 525/89; 525/98; 525/99
[58] Field of Search ................. 525/89, 98, 99

[56] References Cited

U.S. PATENT DOCUMENTS

| | | |
|---|---|---|
| 3,979,480 | 9/1976 | Radici et al. |
| 4,178,465 | 12/1979 | Caporiccio et al. |
| 4,843,049 | 1/1989 | Invernizzi et al. |
| 4,939,207 | 7/1990 | Fasulo et al. ............. 525/89 |
| 5,019,631 | 5/1991 | Farias et al. |
| 5,104,895 | 4/1992 | Spinelli et al. |

FOREIGN PATENT DOCUMENTS

| | | |
|---|---|---|
| 0010558 | 5/1980 | European Pat. Off. |
| 0060524 | 9/1982 | European Pat. Off. |
| 0437745A2 | 12/1990 | European Pat. Off. |

OTHER PUBLICATIONS

Quirk et al., Block Copolymers, 1989, p. 2.
Chem. Abstract, vol. 111, 1989, Abs. No. 111:116348j-Jap. Pat. 01-90248.
Chemical Abstracts vol. 110, 1989-155546w Impact-Resistant Polystyrene Compositions With Good Surface Glass (Asahi Chemical Co.).
European Search Report, EP 91 10 2187.

*Primary Examiner*—Melvyn I. Marquis
*Assistant Examiner*—D. Aylward
*Attorney, Agent, or Firm*—Morgan & Finnegan

[57] ABSTRACT

This invention relates to blends based on vinyl aromatic polymers endowed with high mechanical characteristics, even after successive processings at temperatures equal to or greater than 200° C., comprising:

a vinyl aromatic polymer containing from 0.5 to 5% by weight of a vinyl aromatic monomer-conjugated diene linear block polymer and from 5 to 15% by weight of a diene rubber;

a polyolefine; and a vinyl aromatic monomer-conjugated diene linear block polymer, having a diene content between 20 and 80% by weight;

the sum of the three components being equal to 100%.

18 Claims, No Drawings

BLENDS BASED ON VINYL AROMATIC POLYMERS WITH ENHANCED MECHANICAL CHARACTERISTICS

FIELD OF THE INVENTION

The present invention relates to blends based on vinyl aromatic polymers endowed with high mechanical characteristics, even after successive processings carried out at temperatures equal to or higher than 200° C., such as for example between 200° C. and 250° C.

More particularly, the present invention relates to blends based on vinyl aromatic polymers having high mechanical and rheological properties, suitable for producing shaped articles endowed with good physical properties and wherein it is possible to recover the processing scraps.

BACKGROUND OF THE INVENTION

As is known, vinyl aromatic polymers are thermoplastic resins suitable for being transformed, under heating, into shaped articles by injection or extrusion molding. Said vinyl aromatic polymers have a fair tensacity, but they are not suitable for use in applications where a high tenacity associated with good chemical resistance is required.

A way for improving those lacking properties is to provide a blend with other polymers having the deficient properties to dotain a material exhibiting the desired combination of properties. However, this approach was successful only in a few cases; generally, in fact, the blending results in the combination of the worst characteristics of each component, the overall result being a material of such poor properties as not to be of any practical or commercial value.

The reasons for this drawback are the fact that not all polymers are compatible with each other and, therefor, do not perfectly adhere. As a result, interfaces are formed among the components of the blend which represent weakness and breaking points.

More particularly, the blending of polystyrene, or generally of a vinyl aromatic polymer or copolymer, either as such or made impact resistant by grafting with a rubber, and a polyolefine, gives rise to blends endowed with heterogeneous structure and mechanical weakness, due to the incompatibility between these two types of polymers.

U.S. Pat. No. 4,386,187 discloses a thermoplastic composition comprising from 54 to 82% by weight of a polyolefin, from 15 to 40% by weight of a vinyl aromatic polymer and from 2 to 10% by weight of a styrene-butadiene-styrene thermoplastic block copolymer.

These compositions are homogenous and can be used for the production of shaped articles; however their poor mechanical characteristics in terms of modulus and IZO D resilience do not make them suitable to be used in the applications where these properties are required.

From published European Patent Application No. 291, 352, it is known that homogeneous polymeric compositions containing a polyolefine and a vinyl aromatic polymer may be prepared by using a vinyl aromatic polymer containing, as elastomeric component, small quantities of a vinyl aromatic monomer-conjugated diene linear block polymer, and, as a compatibilizing agent between the polyolefine and the vinyl-aromatic polymer, a vinyl aromatic monomer-conjugated diene star-block polymer.

Particularly, the above reported European Patent Application No. 291, 352 discloses a polymeric blend comprising:

- from 40 to 98% by weight of a vinyl aromatic polymer containing dispersed therein, as an elastomeric component, from 0.5 to 5% by weight of a vinyl aromatic monomer-conjugated diene linear block copolymer;
- from 1 to 54% by weight of a polyolefine; and
- from 1 to 20% by weight of a vinyl aromatic monomer-conjugated diene star block copolymer; the sum of the three components being equal to 100%.

The above reported blends are homogeneous and suitable for being transformed into shaped articles by extrusion, injection molding and/or thermoforming; however, they show some drawbacks which limit the use thereof in such processes. The main drawback is that the processing scraps cannot be reused owing to a drastic lowering of the mechanical properties of the blend, particularly the resilience and the breack elongation. This undesired effect involves a waste or a not-noble use of the processing scraps, the amount of which may be even 50-60% of the virgin product.

DESCRIPTION OF THE INVENTION

The present invention provides a composition based on vinyl aromatic polymers which does not exhibit the above reported drawbacks.

The thermoplastic polymeric composition of the present invention is characterized in that it comprises:

- from 10 to 90% by weight of a vinyl aromatic polymer (A) containing, as an elastomer component, from 0.5 to 5% by weight of a vinyl aromatic monomer conjugated diene linear block copolymer and from 5 to 15% of a diene rubber;
- from 5 to 50% by weight of a polyolefine (B); and
- from 5 to 40% by weight of a vinyl aromatic monomer-conjugated diene linear block polymer (C), having a diene amount comprised between 20 and 80% by weight; the sum of the three components (A), (B) and (C) being equal to 100.

Preferably, the polymeric composition of the present invention contains:

- from 60 to 80% by weight of a vinyl aromatic polymer (A);
- from 10 to 30% by weight of a polyolefine (B); and
- from 5 to 20% by weight of a vinyl aromatic monomer-conjugated diene linear block polymer (C); the sum of components (A), (B), and (C) being equal to 100.

The vinyl aromatic polymer (A) may be prepared by carrying out the polymerization of a vinyl aromatic monomer having the general formula:

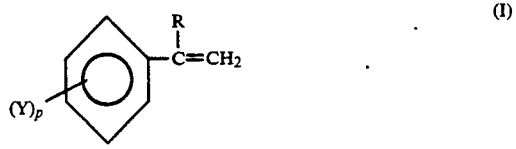

(I)

wherein R represents hydrogen or an alkyl radical having from 1 to 4 carbon atoms; p is zero or an integer from 1 to 5, and Y represents a halogen atom or an alkyl radical having from 1 to 4 carbon atoms, in the presence of a diene rubber and of a vinyl aromatic monomer conjugated diene linear block polymer, in the above reported amount, optionally by using conventional radicalic polymerization catalysts.

Examples of vinyl aromatic compounds having the above general formula are: styrene; methyl-styrene; mono-, di-, tri-, tetra- and penta-chlorostyrene and the corresponding alpha-methyl-styrenes; styrenes alkylated in the nucleus and the corresponding alpha-methylstyrenes such as ortho- and para-methyl-styrenes, ortho- and paraethyl-styrenes; ortho- and para-methyl-alpha-methyl-styrenes etc. These monomers may be used either alone or in admixture with each other or with other copolymerizable co-monomers such as, for instance, maleic anhydride, acrylonitrile, methacrylonitrile, $C_1$–$C_4$ alkyl esters of acrylic or methacrylic acid.

The used diene rubber is preferably comprised from 7 to 12% by weight and may be polybutadiene, high or medium cis- and low viscosity polybutadiene, poly-isoprene, copolymers of butadiene and/or isoprene with styrene or with other monomers.

The vinyl aromatic monomer-conjugated diene linear block polymer is preferably comprised between 2 and 5% by weight. It is per se well known in the art and available on the market.

These linear block polymers contain from 20 to 75% by weight of recurring units of a vinyl aromatic monomer and, correspondingly, from 80 to 25% by weight of recurring units of a conjugated diene.

These block polymers can be constituted only by pure blocks or can optionally contain random or tapered polymeric segments (B/S) or can be constituted by random and/or tapered copolymers.

The above linear block polymers are described by Allen Noshay and James E. McGrath "Block Copolymers" 1977 pages 83–92, 186–192, the contents of which is included in the present description as a reference. Further information on the properties, structure and characteristics of these linear block copolymers is reported by Holden et al "Thermoplastic Elastomers" published by N. R. Legge et al. 1987.

Linear block polymers of this type are available on the market for example as "SOLPRENE® 1205", "SOLPRENE® 308" and "SOLPRENE® 314" produced and sold by Philips Petroleum.

The preparation of the vinyl aromatic polymer (A) can be carried out according to any known suspension, bulk-suspension or continuous bulk polymerization process.

A preferred method of preparation consists in carrying out a pre-polymerization of the vinyl aromatic monomer in the presence of a conventional free radical catalyst, of a dienic rubber and of the above block polymer in a first reactor up to the attainment of a conversion lower than 50% by weight of the fed monomers.

Then, the polymerization is completed in one or more subsequent reactors up to the complete polymerization of the monomer. The thus-obtained polymer is then devolatilized and granulated.

The polyolefine (B) is preferably polyethylene comprising the linear low density (LLDPE), the medium density and the high density polyethylene. Other polyolefines such as polypropylene, polybutene, polymethylpentene, as well as the copolymers of two or more alphaolefines such as, for example, ethylene-propylene copolymers, the copolymers of an alpha-olefine with an ethylenically unsaturated monomer different from the alpha-olefine, such as for example ethylene-vinyl acetate (EVA) copolymers, also may be used.

The vinyl aromatic monomer-conjugated diene linear block copolymer (C), used as a compatibilizing agent in the composition of the present invention, is also of a known type and available on the market. This linear block copolymer is of the type:

$$S\text{-}B; \qquad (II)$$

$$S_1\text{-}B\text{-}S_2; \qquad (III)$$

$$B_1\text{-}S_1\text{-}B_2\text{-}S_2; \qquad (IV)$$

wherein:
S, $S_1$, $S_2$ are non-elastomeric polymer blocks of a vinyl aromatic monomer of the above formula (I), having the same or different molecular weight; and
B, $B_1$ and $B_2$ are elastomeric polymer blocks based on a conjugated diene having the same or different molecular weight.

These linear block polymers (C) are already known in the literature and disclosed in U.S. Pat. No. 3,265,765, the contents of which is included in the present description as a reference. Further information of the phisical and structural characteristics of these polymers is reported by B.C. ALLPORT et AL. "Block Copolymers" Applied Science Publishers Ltd. 1973.

The monovinyl aromatic monomer particularly suitable for the preparation of the block copolymers (C) is styrene; alkyl-substituted styrenes showing the same copolymerization properties, such as for instance methyl-styrenes, ethyl-styrenes, t.-butyl-styrenes, etc., may also be used.

Conjugated dienes useful for preparing the block copolymers (C) are those having from 4 to 8 carbon atoms in the molecule, such as for instance: 1,3-butadiene, isoprene, 2,3-dimethyl-1,3-butadiene, piperylene, and mixtures thereof.

In the linear shaped polymers (C), the non-elastomeric polymer block is preferably polystyrene having a molecular weight comprised between 5,000 and 250,000. The elastomeric polymer block is preferably polybutadiene having a molecular weight comprised between 2,000 and 250,000.

Between the S, $S_1$, $S_2$ and B, $B_1$ and $B_2$ polymeric blocks can be present random and or tapered segments wherein the transition between the B, $B_1$ and $B_2$ blocks and S, $S_1$ and $S_2$ blocks can be gradual in the sense that the proportion of the vinyl aromatic monomer in the dienic polymer increases progressively in the direction of the non-elastomeric polymer block, while the proportion of the conjugated diene accordingly decreases progressively; or can be constituted by a zone wherein the styrene and butadiene monomers statistically alternate. The molecular weight of the random and or tapered segments are preferably comprised between 500 and 50,000.

The linear block polymers (C) are availble on the market, for example with the trade name "CARIFLEX® TR 1102 S", produced and sold by Soc. SHELL or with the trade name "FINAPRENE® 315" produced and sold by Soc. FINA.

A linear block polymer (C) particularly preferred in the compositions of the present invention is that having formula (IV) $B_1$-$S_1$-$B_2$-$S_2$ having a ponderal molecular weight from 30,000 to 250,000 and a total content of butadiene monomer units from 40 to 80% by weight; in this polymer the average ponderal molecular weight of block $B_1$ varies from 0.1 to 0.5 times that of block $B_2$ and the average ponderal molecular weight of block $S_1$ varies from 0.25 to 2.0 times that of block $S_2$. This preferred polymer contains, furthermore, a copolymeric segment, formed of statistically linked diene and vinyl aromatic monomeric units, between the blocks $B_1$ and $S_1$.

This linear block polymer is known in the literature by published Italian Patent Application No. 21, 563 A/87 filed on Jul. 31, 1987, the contents of which is included in the present description as a reference, and it is produced and sold by ENICHEM ELASTOMERI with the trade-name "EUROPRENE ® SOL T 168".

The blend of the present invention may be prepared by carrying out first a blending of the components at a low temperature, in any known type of mixer. Then, the blend is extruded in single-screw or twin-screw extruders at a temperature preferably between 150° and 250° C.

The compositions may contain a small amount, generally from 0.1 to 3% by weight, of a stabilizing agent or of other additives, intimately mixed therein.

Plasticizers, lubricants, anti-flame agents, flowing agents, anti-static agents, dyestuffs, pigments, foaming agents for the production of low density articles and semi-finished products, and so on may be added during the mixing of the components, in quantities from 0.1 to 10% by weight.

The blends of the present invention are easily processed and exhibit a set of properties which, on the whole, are significantly better than those of the individual components. For this reason, the blends of the present invention find useful application for manufacturing articles endowed with high mechanical and rheological properties combined with high chemical resistance.

Therefore, the blends of the present invention can be usefully applied in the fields of electric appliances, electronics, and generally in the field of technical materials, in the form of films, sheets, tapes, bands, rods, boxes, cups, containers, etc.

The blends may be used to provide foamed articles by techniques per se known in the art.

A further advantage of the blends of the present invention is that they maintain substantially unvaried all the mechanical properties even after repeated processing operations at temperatures equal to or higher than 200° C. For these properties, the processing scraps can be recovered and may be recycled in the process and used again as the virgin material.

EXAMPLES

The following illustrative but not limiting Examples are given in order still better to comprehend the present invention and to put it into practice.

In the examples all parts are expressed by weight, unless otherwise indicated.

Example 1 (Comparison)

In a rotating drum at room temperature a blend was prepared constituted by:

75 parts by weight of an impact-resistant styrene polymer (A) containing dispersed in the polymeric matrix 7.75% by weight of a polybutadiene rubber and 3% of a linear block polymer (SOLPRENE ® 1205 produced and sold by Phillips Petroleum) containing 25% of styrene and 75% of butadiene and having a molecular weight of 75,000;

15 parts by weight of a linear low density polyethylene (LLDPE) (B) having a density of 0.926 g/cm$^3$ and an M.F.I. of 0.7 g/10 min.; and 10 parts by weight of a radial block polymer (D) comprising 70% by weight of butadiene and 30% by weight of styrene, containing silicon as coupling radical, each polymeric unit having a molecular weight of 40,000.

The thus-obtained blends were extruded from a mono-screw BANDERA TR 45 extruder having a diameter of 45 mm.

The thermal profile of the extruder between the hopper and the extrusion head was 150° C., 180° C., 190° C., 215° C.

The granule of the first extrusion was then re-extruded in the same mono-screw BANDERA TR 45 extruder at the temperature of 240° C. and with a residence time in the extruder of 55 seconds.

The resilience, elongation and rheological properties of the obtained samples were determined after two, four and six extrusion processes carried out in the same extruder and in the same processing conditions.

For the rheological properties, the Melt flow index (M.F.I.) was determined according to ASTM D 1238, at 220° C. and 10 Kg; and the resilience IZOD, with notch, was determined at 23° C., according to ASTM D 256, on test pieces having 12.7 mm thickness, obtained by injection molding at a temperature of 190° C. on a NEGRI & BOSSI V 17-110 FA, and the break elongation was determined according to ASTM D 638.

The measured properties are listed in the following Table.

Example 2

By operating in the same process conditions of example 1, a blend was prepared constituted by:

75 parts by weight of the impact-resistant styrene polymer (A) of example 1;

15 parts by weight of the linear low density polyethylene (LLDPE) (B) of example 1; and 10 part by weight of a linear block polymer (C) having the structure (IV), comprising 57% by weight of butadiene and 43% by weight of styrene, sold by Soc. ENICHEM Elastomeri with the trade-name "EUROPRENE ® SOL T 168".

The rheological, IZOD resilience and elongation properties are listed in the following Table.

TABLE 1

| NUMBER OF EXTRUSIONS | COMPARATIVE EXAMPLE 1 | | | EXAMPLE 2 | | |
|---|---|---|---|---|---|---|
| | IZOD (J/m) | M.F.I (g/10') | ELONGATION (%) | IZOD (J/m) | M.F.I (g/10') | ELONGATION (%) |
| 1 | 280 | 30 | 74 | 320 | 36 | 75 |
| 2 | 220 | 18 | 65 | 320 | 35 | 70 |
| 4 | 140 | 25 | 55 | 280 | 25 | 69 |
| 6 | 105 | 30 | 45 | 240 | 20 | 69 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. A blend based on vinyl aromatic polymers endowed with high mechanical properties even after successive processings at temperatures equal to or higher than 200° C., comprising:

from about 10 to 90% by weight of a vinyl aromatic polymer (A) formed by the polymerization of a vinyl aromatic monomer in the presence of both a linear block polymer and a diene rubber, wherein the vinyl aromatic polymer (A) contains from 0.5 to 5% by weight of a vinyl aromatic monomer-conjugated diene linear block polymer and from 5 to 15% of a diene rubber;

from about 5 to 50% by weight of a polyolefin (B); and, from about 5 to 40% by weight of a vinyl aromatic monomer-conjugated diene linear block polymer (C) having a diene amount between 20 and 80% by weight, wherein the sum of the above three components is equal to 100.

2. The blend based on vinyl aromatic polymers according to claim 1, comprising:

from 60 to 80% by weight of the vinyl aromatic polymer (A);

from 10 to 30% by weight of a polyolefin (B); and from 5 to 20% by weight of a vinyl aromatic monomer-conjugated diene linear block polymer (C); the sum of the above three components being equal to 100.

3. The blend based on vinyl aromatic polymers according to claim 1, wherein the amount of the diene rubber in the vinyl aromatic polymer (A) is between 7 and 12% by weight.

4. The blend based on vinyl aromatic polymers according to claim 1, wherein the amount of the vinyl-aromatic monomer-conjugated diene linear block polymer, in the vinyl aromatic polymer (A), is between 2 and 5% by weight.

5. The blend based on aromatic vinyl polymers according to claim 1, wherein the vinyl aromatic monomer-conjugated diene linear block polymer contains from 20 to 75% by weight of recurring units of a vinyl aromatic monomer and, correspondingly, from 80 to 25% by weight of recurring units of a conjugated diene.

6. The blend based on vinyl aromatic polymers according to claim 1, wherein the linear block copolymer is constituted by pure polymeric blocks of vinyl aromatic monomer and conjugated diene monomer.

7. The blend based on vinyl aromatic polymers according to claim 1, wherein the linear block polymer contains random and/or tapered segments of vinyl aromatic monomer and of conjugated diene.

8. The blend based on vinyl aromatic polymers according to claim 1, wherein the linear block polymer is constituted by random and/or tapered polymers of vinyl aromatic monomer and of conjugated diene.

9. The blend based on vinyl aromatic polymers according to claim 1, wherein the polyolefin is low density, high density, or medium density linear polyethylene.

10. The blend based on vinyl aromatic polymers according to claim 1, wherein the vinyl aromatic monomer-conjugated diene linear block polymer (C) is of the type:

$$S\text{-}B; \qquad (II)$$

$$S_1\text{-}B_1\text{-}S_2, \text{ or} \qquad (III)$$

$$B_1\text{-}S_1\text{-}B_2\text{-}S_2 \qquad (IV)$$

wherein:

S, $S_1$ and $S_2$ are non-elastomeric polymer blocks of a vinyl aromatic monomer having the same or different molecular weight and B, $B_1$ and $B_2$ are elastomeric polymer blocks based on a conjugated diene, having the same or different molecular weight.

11. The blend based on vinyl aromatic polymers according to claim 10, wherein random and/or tapered segments are present between the S, $S_1$ and $S_2$ and B, $B_1$ and $B_2$ polymeric blocks.

12. The blend based on vinyl aromatic polymers according to claim 10, wherein the non-elastomeric polymer block is polystyrene having a molecular weight between 5,000 and 250,000 and the elastomeric polymer block is polybutadiene having a molecular weight between 2,000 and 250,000 and the random and/or tapered segments have a molecular weight between 500 and 50,000.

13. The blend based on vinyl aromatic polymers according to claim 10, wherein the linear block polymer (C) has formula:

$$B_1\text{-}S_1\text{-}B_2\text{-}S_2$$

having a ponderal average molecular weight from 30,000 to 250,000 and a total content of butadiene monomeric units from 40 to 80% by weight, wherein the average ponderal molecular weight of block $B_1$ varies from 0.1 to 0.5 times that of block $B_2$ and the average ponderal molecular weight of block $S_1$ varies from 0.25 to 2.0 times that of block $S_2$ and wherein said polymer (C) further contains a copolymeric segment, formed of statistically linked diene and vinyl aromatic monomer units, between $B_1$ and $S_1$ blocks.

14. A blend based on vinyl aromatic polymers endowed with high mechanical properties even after successive processings at temperatures equal to or higher than 200° C., comprising:

from 10 to 90% by weight of an impact-resistant vinyl aromatic polymer (high-impact polystyrene) which includes a rubber portion that is a mixture of (i) 5–15% by weight of a diene rubber and (ii) 0.5 to 5% by weight of a linear block polymer of polystyrene blocks (S) and polybutadiene blocks (B), wherein the linear block polymer (ii) contains block polymers constituted by pure blocks (B) and (S) or random or tapered polymeric segments (B/S) between the blocks (B) and (S), or random and/or tapered block copolymers;

from 5 to 50% by weight of a polyolefin; and from 5 to 40% by weight of a vinyl aromatic monomer-conjugated diene linear block polymer having a diene amount between 20 and 80% by weight which includes polystyrene blocks (S) and polybutadiene blocks (B) and having the structure:

$$S\text{-}B; \qquad a)$$

$$S_1\text{-}B\text{-}S_2 \qquad b)$$

$$B_1\text{-}S_1\text{-}B_2\text{-}S_2 \qquad c)$$

wherein random and/or tapered segments (B/S), ($B_1/S_1$), and ($B_2/S_2$) can be present between the blocks (S), ($S_1$), and ($S_2$), and (B), ($B_1$) and ($B_2$) wherein the transition between the blocks (B), ($B_1$), ($B_2$) and (S), ($S_1$)

and ($S_2$) is gradual and the sum of components (A), polyolefin (B) and (C) equals 100.

15. The blend based on vinyl aromatic polymers according to claim 1, wherein the vinyl aromatic monomer-conjugated diene linear block polymer (C) is of the type:

$$B_1\text{-}S_1\text{-}B_2\text{-}S_2 \qquad (IV)$$

wherein:
$S_1$ and $S_2$ are non-elastomeric polymer blocks of a vinyl aromatic monomer having the same or different molecular weight
and $B_1$ and $B_2$ are elastomeric polymer blocks based on a conjugated diene, having the same or different molecular weight.

16. A blend based on vinyl aromatic polymers endowed with high mechanical properties even after successive processings at temperatures equal to or higher than 200° C., comprising:
from about 10 to 90% by weight of an impact-resistance vinyl aromatic polymer which includes a rubber portion that is a mixture of (i) 5-15% by weight of a diene rubber and (ii) 0.5 to 5% by weight of a linear block polymer of polystyrene blocks (S) and polybutadiene blocks (B), wherein the linear block polymer (ii) contains block polymers constituted by pure blocks (B) and (S) or random or tapered polymeric segments (B/S) between the blocks (B) and (S), or random and/or tapered block copolymers;
from about 5 to 50% by weight of a polyolefin; and,
from about 5 to 40% by weight of a vinyl aromatic monomer-conjugated diene linear block polymer having a diene amount between 20 and 80% by weight which includes polystyrene blocks (S) and polybutadiene blocks (B) and having a structure:

$$B_1\text{-}S_1\text{-}B_2\text{-}S_2 \qquad (IV)$$

wherein random and/or tapered segments (B/S), ($B_1/S_1$) and ($B_2/S_2$) can be present between the blocks ($S_1$), and ($S_2$), and ($B_1$) and ($B_2$) wherein the transition between the blocks ($B_1$), ($B_2$) and ($S_1$) and ($S_2$) is gradual and the sum of components (A), polyolefin (B) and (C) equals 100.

17. The blend according to claim 16, wherein the vinyl aromatic polymer is high impact polystyrene.

18. A blend based on vinyl aromatic polymers endowed with high mechanical properties even after successive processings at temperatures equal to or higher than 200° C., consisting essentially of:
from about 10 to 90% by weight of a vinyl aromatic polymer (A) formed by the polymerization of a vinyl aromatic monomer in the presence of both a linear block polymer and a diene rubber, wherein the vinyl aromatic polymer (A) contains from 0.5 to 5% by weight of a vinyl aromatic monomer-conjugated diene linear block polymer and from 5 to 15% of a diene rubber;
from about 5 to 50% by weight of a polyolefin (B); and,
from about 5 to 40% by weight of a vinyl aromatic monomer-conjugated diene linear block polymer (C) having a diene amount between 20 and 80% by weight, wherein the sum of the above three components is equal to 100.

* * * * *